Sept. 5, 1933.    W. H. BROOKS    1,925,786

APPARATUS FOR PRODUCING HOMOGENEOUS LIQUIDS

Filed July 7, 1928

Inventor
William H. Brooks
By his Attorney

Patented Sept. 5, 1933

1,925,786

UNITED STATES PATENT OFFICE 1,925,786

APPARATUS FOR PRODUCING HOMOGENEOUS LIQUIDS

William H. Brooks, Oconomowoc, Wis., assignor to Carnation Company, a corporation of Delaware Application July 7, 1928. Serial No. 291,018

9 Claims. (Cl. 99—2)

This invention relates to an apparatus for producing homogeneous liquids, especially liquids which are a mixture of two or more ingredients differing in density and other characteristics.

An object of the invention is to provide a device by which the defects of previous improvements in this field are obviated. Heretofore liquids to be rendered homogeneous and uniform in composition; especially liquids containing one or more fatty or oily substances, such as milk bearing globules of butter fat; have been treated for the purpose by passing them at high pressure between surfaces in close proximity; and at the usual velocities or rates of flow, the wear on such surfaces has been rapid and extensive. Hence poor results are secured in operation, and frequent and very accurate refitting becomes necessary. Where only two adjacent surfaces have been utilized, conditions have always been very troublesome and where a larger number of such surfaces were included, accurate fitting has been found almost impossible. Hence the passages between said surfaces through which the liquid was passed often became such that the liquid in passing through them met with too little resistance to afford effective operation; and the liquid when delivered was apt to show very slight change in character, and little or no approach whatever to the degree of homogeneity and uniformity desired.

An object of the present invention is to provide an apparatus and method in which the liquid to be made uniform passes between surfaces that have been especially designed to prevent wear, and to cause the ingredients of the liquid to be thoroughly mixed. Thus while the flow can be made to take place at the proper velocity and the necessary pressure utilized, undue wear is avoided and a final product of great uniformity and superior quality is assured.

The invention can be utilized in the case of milk to break up globules of butter fat and the like into much smaller particles, and to divide particles of cream to such an extent that same will thereafter remain in suspension and not collect on the surface of the milk. This result can be obtained with raw or fresh milk when separated for standardizing, by adding a definite amount of butter to a definite amount of skimmed or separated milk, which is later made homogeneous, and can be sold as an improved product for infant, child and invalid feeding, being more easily digestible because of its greater uniformity. The invention can also be utilized in the treatment of condensed and evaporated milk to prevent or materially retard separation of butter fat in the containers during the interval between the manufacture of the milk and consumption, as well as to make a more palatable, uniform, smooth and lumpless product; for ice cream the same procedure may be followed.

Further my invention is by no means restricted to the treatment of milk and milk products, but it can be utilized for the compounding of lubricating oils with grades of oil of various density and viscosity, to secure uniformity throughout and avoid separation of light and heavy components; in the manufacture of greases and semi-fluid lubricants, to make products which will not harden under low temperatures by adding components which do not so harden, usually the more fluid component is apt to separate during storage and under higher temperature; and the invention can further be utilized similarly in the manufacture of soaps, cosmetics, emulsions of oils, such as cod liver, castor and petroleum oils masked with fluids and pastes surrounding the microscopic globules of oil with more or less fluid substance of less disagreeable odor, taste and appearance; and to improve the oils themselves in regard to their digestibility and qualities of lubrication or assimilation, due to their homogeneous and more finely divided condition.

The nature of the invention will be made clear from the following description taken with the accompanying drawing which show how the preferred form of my invention is practiced. But this disclosure is illustrative only and I may make changes in the details of construction proceeding without departing from the principle of the invention or exceeding the scope of the appended claims.

On the drawing.

On the drawing the same numerals identify the same parts throughout.

Figure 1:
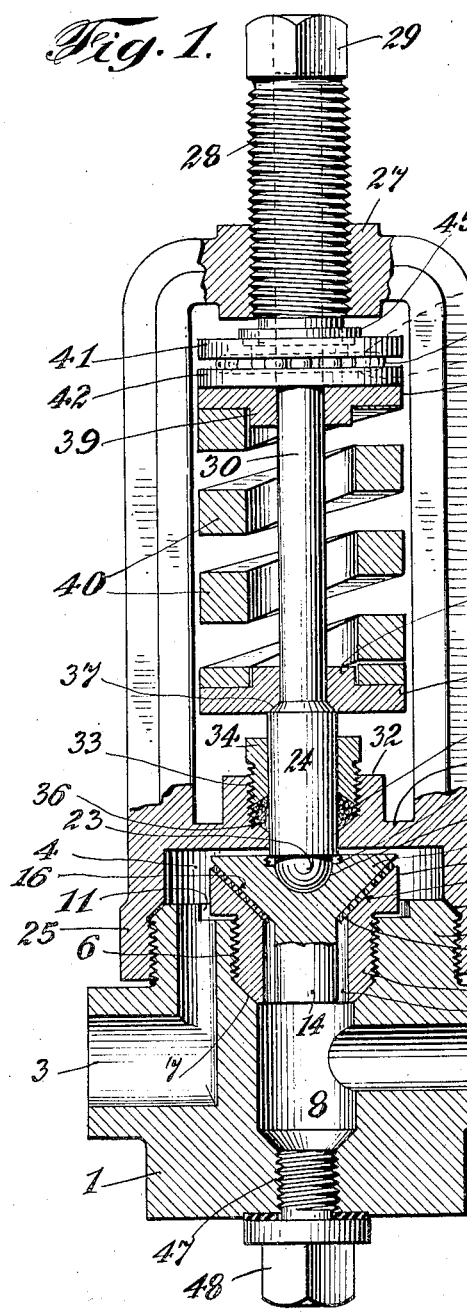
Figure 1 shows a device by which the result desired can be obtained in the practice of my invention.

In the particular example of the apparatus by means of which my invention is practiced, the numeral 1 indicates a head having an inlet passage 2 and an outlet passage 3; the inlet passage 2 leading to an enclosed space or chamber 4 which delivers to the outlet 3 and in which the liquid undergoes the necessary treatment to impart to it the required physical character. The part 1 has a threaded neck 5 through which the outlet 3 communicates with the chamber 4 and this part is also provided with a central threaded bore 6 terminating in a conical seat 7 below which is a smaller bore 8 communicating with the inlet 2. Into the threaded bore 6 and engaging the conical seat 7 I screw a threaded bushing or sleeve 9 having a head 10 and the outer end or entrance to the threaded bore 6 may be counterbored, as indicated at 11 to receive the head 10. The head 10 has a passage extending through it, as indicated at 12, to connect the space 8 with the chamber 4, and this passage is square or has a shape which is other than circular.

The extremity of the bore or passage 12 at the head 10 is expanded to provide a conical surface 13; and fitting into the passage or bore 12 is a stem 14 having a conical head 15. The stem or shank 14 is preferably round and the head 15 is conical like the head of a valve forming a surface 16 which matches and cooperates with the surface 13 in the end of the sleeve 9. Hence the liquid to be treated on entering the inlet 2 and reaching the space 8, can flow through the bore or passage 12 between the stem 14 and inside surface of the sleeve 9, and then by way of the annular channel between the surfaces 13 and 16 to the chamber 4 and be discharged by way of the outlet 3. The valve-shaped body comprising the shank 14 and head 15 is held firmly in position, and while passing between the surfaces 13 and 16 the liquid is so affected as to receive the characteristics desired.

In most prior constructions the surfaces 13 and 16 have been made smooth and shaped to fit each other accurately, so that if nothing intervened the surfaces 13 and 16 could come into contact over their entire extent. As the liquid to be treated was forced between two such surfaces as 13 and 16 at the necessary pressure and velocity, these surfaces quickly became eroded and pitted; giving rise to defective operation and requiring frequent and very accurate refitting. In the practice of my invention, however, I avoid such erosion and wear by altering one or both of the surfaces 13 and 16 in such a way that, while the liquid is forced through at the same pressure and velocity the wearing away of the surfaces is prevented; the ingredients of the liquid are thoroughly and intimately mixed and the effective life of the parts is vastly increased.

Figures 2, 4:
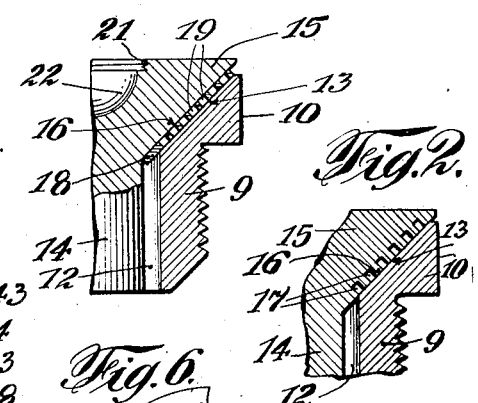
Fig. 2 is a detail view of two cooperating parts in section between which the ingredients of the liquids are forced to flow under such conditions that uniformity and homogeneity ensue.
Fig. 4 is a sectional view showing a modification of the construction of Fig. 2.
Figures 3, 6:
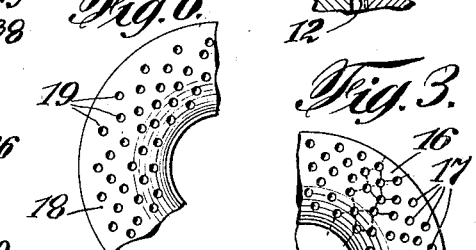
Fig. 3 is a bottom plan view of a portion of one of the parts shown in Fig. 2.
Fig. 6 is a bottom plan view of a portion of one of the parts shown on Fig. 4.

To achieve the objects of my invention, I proceed as shown fully in Figs. 2, 3, 4 and 5. Referring first to Figs. 2 and 3, I make the conical surface 13 smooth, as before, but the surface 16 is shown as being pitted by a number of small recesses 17. These recesses 17 are arranged in radially spaced circular rows on the conical surface 16, all concentric in the embodiment shown, but the recesses or indentations in each row, instead of being in line with one another radially, are so situated that the recesses or indentations of successive rows are staggered. Hence when the liquid is forced between the two surfaces 13 and 16, it does not take a straight radial path but has a tendency to follow the zig-zag line of flow indicated by the dotted lines in Fig. 3. This tendency is due to the fact that the liquid takes the shortest path between adjacent recesses and as said recesses fill up they form minute pools. In its flow the liquid is simply transferred from one of these pools to another until it is delivered into the chamber 4. The recesses or indentations are of slight depth but they serve to prevent the liquid from issuing or spurting too rapidly into the chamber 4 and thus the usual erosion and wear are eliminated. In its passage through the annular chamber between the smooth surface 13 and indented surface 16, the heavy and light components of the liquid are attenuated, finely divided and thoroughly commingled and when the liquid is delivered through the outlet 3, the components are so fully disseminated through the body of the liquid that it has the uniform and homogeneous character which is desired.

Figure 5:
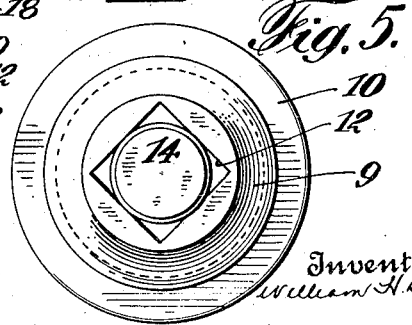
Fig. 5 is an end view of Fig. 4.

In the construction shown in Figs. 4, 5 and 6, the cooperating surfaces 13 and 16 are both smooth but in between these two surfaces I place a perforated conical member 18 having apertures 19. These apertures 19 act in the same way as the recesses or indentations 17, causing the liquid to flow diagonally between the surfaces 13 and 16; because the apertures 19 are staggered in the same way as the recesses 17. This part 18 may be made of some material which is softer than the heads 10 and 15. The wear may be more rapid on the part 18 than on the surfaces 10 and 16, but all that is needed to insure continuous, efficient operation is to replace the part 18 at frequent intervals. Frequent refitting or grinding or polishing of the surfaces 13 and 16 becomes unnecessary.

Figure 7:
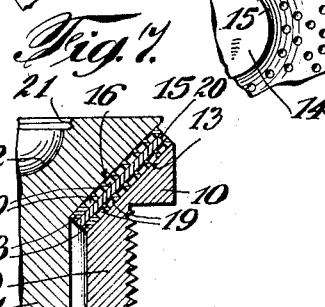
Fig. 7 is similar to Fig. 2 showing another modification.

In Fig. 7 I show two members 18 having apertures 19, one in contact with each of the surfaces 13 and 16, separated by an imperforate conical member 20. This part 20 may be as hard as the parts carrying the surfaces 13 and 16, and the two perforated members 18 may be as soft as before. In some cases the intervening member 20 may be perforated, grooved or corrugated but in any event such spaced portions are disconnected or discontinuous; and the apertures 19 in the two members 18 are staggered as before so that the liquid takes a zig-zag path from the passage 12 to the chamber 4.

The head 15 is centrally recessed as shown at 21 and this recess may have a concave bottom 22 to receive the rounded end 23 of a plunger 24, which urges the head 15 toward the head 10 so as to make the surfaces 13 and 16 keep close to each other as shown in Figs. 2 and 3, and to have the same effect in the structure shown in Figs. 4, 5, 6 and 7. The threaded part 5 of the neck screws into a hollow head 25 which has an internally-threaded rim and contains the chamber 4. Made rigid and preferably integral with this head 25 is a yoke 26, comprising arms which are united by a threaded bearing 27 in which is screwed a threaded sleeve 28 bearing a head 29, so that it can easily be turned. The inside of this sleeve has a smooth bore to receive the stem 30 attached to the plunger 24. The top of the head 25 is shown closed at 31, and it has a central boss 32 with internal threads to engage a packing gland 34. This gland 34 compresses packing 35 against a conical shoulder 36 on the inside of the boss 32; which of course is bored all the way through to enable the plunger 24 to project through the top 31 and the head 25 and into the chamber 4 to engage head 15.

The plunger 24 is united to the stem 30 by a conical shoulder 37, and carries a disc-shaped abutment 38, which abuts against the shoulder 37. This abutment 38 has a central boss 39, which is encircled by one end of a spring 40. The other end of the spring engages a similar abutment on the stem 30 and between this abutment and the bearing 27, are discs 41 and 42, each of which is recessed at 43 so as to receive an anti-frictional element 44, thus a ball bearing is provided which is between the upper abutment 38 of the spring 40 and a washer 45, which may abut against the inner end of the threaded sleeve 28. This sleeve 28 may be turned to compress the spring 40 to the required degree, and the ball bearing reduces the friction of the parts when the adjustment is made.

The threaded neck 5 and the inside of the head 25, may be provided with matching conical surfaces to receive a packing gland 46, so as to make the chamber 4 leakproof. Further, the space 8 may open through the bottom of the head 1 and which may be threaded as at 47 to receive a threaded closing plug 48.

In the complete device shown in Fig. 1, the construction illustrated in Figs. 2 and 3 may be employed; or that shown in Figs. 4 and 5, or the device shown in Fig. 6. In Fig. 2 the spring makes the surface 13 and the indented surface 16 engage each other; but the parts 9 and 10 can still be moved to a sufficient extent when the liquid is forced in through the inlet 2 to enable the liquid to find its way into the chamber 4, and the same action takes place with the other constructions.

In operation suppose milk containing cream or globules of butter fat is the liquid to be treated. This liquid is forced through the inlet 2 and it makes its way into the chamber 4. If the construction utilized in Figs. 2 and 3 be employed, the milk takes a zig-zag path between the heads 10 and 15 of the chamber 4 and the particles of cream are so finely divided and evenly distributed that when the liquid is discharged at the outlet 3, it has all the homogeneity required. The annular channel between the surfaces 13 and 16 is not obstructed but the indentations or pits 17 keep the velocity from becoming too great and wearing away the two surfaces 13 and 16. The construction shown in Figs. 4, 5 and 6 are preferred forms of my invention because when the relatively soft member or members 18 become worn they can cheaply be replaced and the heads 10 and 15 with their surfaces 13 and 16, do not need any refitting. With these devices the apparatus can be operated with great efficiency over long periods.

While the apparatus is especially adapted for the treatment of milk, I of course can use it just as well for the treatment of other substances, for example, a liquid containing any kind of oil can be treated and so modified that the oil will be finely divided and evenly distributed through the whole body of the liquid. Hence I can use the apparatus for the production of emulsions and medicines; and where the liquid contains oil and is intended for use as a medicine taken in combination with something else to modify either the taste or the action of the oil, the particles of oil can be so finely divided that each will be covered with a coating of a different liquid, so as to afford the desired effect. The liquid to be treated need not belong to the class of substances which are to be taken into the human system as either food or medicine; but it can also be employed for the mixing of paints, lubricating oils containing ingredients of various density and viscosity, and similarly treating any other substances. The efficiency of my invention is due not only to the fact that the path of the liquid is made longer from bore 12 to the chamber 4, but also to the fact that the recesses 17 of Fig. 2 and the corresponding recesses or indentations or pits 19, Figs. 3, 4, 5 and 6 permit the formation of small pools each separated from the other in disconnected or discontinuous fashion. Such separated pits serve to break up and to hold the fat particles in separated broken form instead of gathering or collecting the same and thereby acting as accumulations of the fat particles as is the case in certain prior art devices which employ continuous grooves or grooves connecting the pools, and the liquid flows from one of these pools to another in continuously changing direction on its way to the chamber 4. Thus the flow of liquid is not retarded; its velocity can be maintained at the required point; but the liquid is prevented from flowing with too great acceleration into the chamber 4; as it would do if the matching surfaces 13 and 16 were preferably smooth and with no such members as are indicated on the drawing at 18 and 20 between them.

Although one specific embodiment of the invention has been particularly shown and described, it will be understood that the invention is capable of modification and that changes in the construction and in the arrangement of the various parts may be made without departing from the spirit or scope of the invenion, as expressed in the following claims.

I claim:—

1. Apparatus for the treatment of liquids comprising a sleeve, a head received in said sleeve, the adjacent portions of the sleeve and head having opposed surfaces forming a channel, a perforated member engaging each of said surfaces, and an imperforate member between the perforated members.

2. A homogenizing valve comprising a valve seat and a valve head opposed thereto and cooperating therewith, and a plurality of homogenizing disks interposed between the seat and the head and disposed at an angle to the horizontal.

3. A homogenizing valve comprising a valve seat, a valve plug cooperating therewith, a plurality of homogenizing disks interposed between the seat and the plug and disposed at an angle to the horizontal, and means connected with the plug for adjusting the same toward or from the seat and regulating the separation of the disks.

4. A homogenizing valve comprising a valve seat having a central bore and having its upper surface dished, a plug fitting within the bore of the seat and having an annular head extending over the upper end of the seat with its under surface flared, a plurality of perforated homogenizing disks resting on the valve seat under said head and conforming to the dished and flared formation of the same, and means for adjusting the valve plug head toward and from the seat.

5. A homogenizing valve comprising a valve seat having a central bore and having its upper surface dished, a plug fitting within the bore of the seat and having an annular head extending over the upper end of the seat with its under surface flared, a homogenizing disc resting on the valve seat under said head and conforming to the dished and flared formation of the same, and means for adjusting the valve plug head toward and from the seat.

6. A homogenizing valve comprising a valve seat, a valve plug cooperating therewith, a perforated homogenizing disc interposed between the seat and the plug and disposed at an angle to the horizontal, and means connected with the plug for adjusting the same toward and from the seat.

7. A homogenizing valve comprising a valve seat and a valve head opposed thereto and cooperating therewith, and a pair of perforated discs separated by an imperforate disc interposed between the seat and the head.

8. A homogenizing valve comprising a valve seat and a valve head having opposed cooperating surfaces disposed at an angle to the horizontal, and alternating perforate and imperforate homogenizing discs interposed between said surfaces.

9. Homogenizing apparatus having an inlet and an outlet, comprising spring-pressed complementary members, having opposed mating surfaces adapted to permit the flow therebetween of the fluid to be homogenized, having a plurality of contacting surfaces interposed in the path of the fluid from the inlet to the outlet adapted to flatten the fat particles of the fluid in its passage therebetween from the inlet to the outlet, and a plurality of disconnected and discontinuous recesses separated from each other radially and circumferentially by the contacting surfaces, said recesses operating to subdivide the fat particles flattened by the contacting surfaces, and preventing the coalescence of the separated particles.

WILLIAM H. BROOKS.